United States Patent [19]

Baum

[11] 4,050,682
[45] Sept. 27, 1977

[54] METHOD AND APPARATUS FOR HANDLING OFF-GASES FROM METAL REFINING VESSEL

[75] Inventor: Joerg Peter Baum, Essen-Sud, Germany

[73] Assignee: Pennsylvania Engineering Corporation, Pittsburgh, Pa.

[21] Appl. No.: 563,844

[22] Filed: Mar. 31, 1975

[51] Int. Cl.$^2$ .............................................. C21C 5/40
[52] U.S. Cl. .................... 266/158; 266/157; 55/226
[58] Field of Search ............................ 266/13, 15–17, 266/35, 157, 158; 122/7 A; 75/59, 60; 55/226; 137/251; 251/124, 330, 333; 261/DIG. 54

[56] References Cited

U.S. PATENT DOCUMENTS

| | | | |
|---|---|---|---|
| 3,558,116 | 1/1971 | Yagi et al. | 266/15 |
| 3,726,065 | 4/1973 | Hausberg et al. | 55/226 X |
| 3,743,264 | 7/1973 | Baum et al. | 266/15 X |
| 3,844,745 | 10/1974 | Hausberg et al. | 266/15 X |
| 3,863,906 | 2/1975 | Vicard | 266/16 |
| 3,908,969 | 9/1975 | Baum et al. | 266/158 X |

FOREIGN PATENT DOCUMENTS 2,016,490  10/1971  Germany .............................. 266/158

Primary Examiner—Roy Lake
Assistant Examiner—Paul A. Bell
Attorney, Agent, or Firm—Fred Wiviott

[57] ABSTRACT

The mouth of a metal refining vessel has a primary gas collection hood supported over it. A duct couples the hood to a gas cleaning quencher which is serially connected by a duct to a wet scrubber. A fan draws gases and suspended particulates through the system and discharges the effluent from the scrubber to a stack which burns the gas in the atmosphere. A secondary gas collection hood is supported over the first hood. The secondary hood has a duct which connects into the gas cleaning system intermediate the quencher and the scrubber. A bell damper connects the duct from the secondary hood into the intermediate duct. When the vessel is tilted away from the primary hood, the damper is opened so that gases escaping from the mouth of the vessel may be captured by the secondary hood and passed through the gas cleaning system. The secondary hood has a chain curtain which yields to allow a ladle or scrap charging box to swing over the vessel mouth when it is tilted.

23 Claims, 11 Drawing Figures

METHOD AND APPARATUS FOR HANDLING OFF-GASES FROM METAL REFINING VESSEL

BACKGROUND OF THE INVENTION

This invention relates to a method and apparatus for handling the off-gases from a vessel in which impure iron is converted into steel.

A known method of making steel involves use of a refractory lined vessel which is supported in a ring from which horizontal trunnion pins extend. The trunnion pins are supported in journals which enable the vessel to be tilted clear of the primary gas collection hood so that the vessel may be charged with hot metal and scrap and so its contents can be poured out from the mouth.

When a bottom blown converter vessel is used, finely divided solid reactants and process gases are injected into the molten metal within the vessel through multipassageway tuyeres which extend through the refractory lining and open into the vessel beneath the surface of the molten metal. In one stage of the refining process, oxygen in which finely divided burnt lime is suspended is injected into the molten metal through one passageway of the submerged tuyeres. A hydrocarbon fluid is injected simultaneously through the other passageway. The reaction between carbon in the impure molten metal and oxygen causes very high temperatures to be developed in the vicinity of the tuyeres. This high temperature would ordinarily result in damage to the tuyeres and the refractory bottom of the vessel but the hydrocarbon fluid effects cooling and thereby preserves the tuyeres and vessel bottom.

The carbon and oxygen reaction results in evolution of carbon monoxide which is an atmospheric pollutant and is combustible or explosive. The evolved or off-gases contain suspended fine particulates which must be removed from the off-gases before the gas is collected for use as a fuel or before it is burned to carbon dioxide and discharged to the atmosphere.

When the vessel is tilted fumes and noxious gases can escape to the atmosphere within the steel plant. This effect is mitigated by a secondary hood which collects the off-gases when the vessel mouth is tilted away from the primary hood. The secondary hood is connected by means of a duct into the gas cleaning system. It has been customary to interpose a damper in the duct between the secondary hood and the gas cleaning system and this damper is closed except when the vessel is tilted or turned down in which case the damper is opened so that the gas cleaning system draws escaping off-gases through the secondary hood. It is important that the damper, valve or whatever means is used to shut off the secondary hood be leak-proof lest oxygen from the air be drawn into the secondary hood to mix with carbon monoxide which evolves from the vessel and is collected by that part of the system which originates with the primary hood. Admission of oxygen containing air in the hot carbon monoxide stream, of course, presents an explosion hazard to the gas cleaning system.

SUMMARY OF THE INVENTION

A primary object of the present invention is to provide a damper for selectively connecting a duct, in which explosive gas flows, with another duct that is shut off on some occasions during processing and that on other occasions is permitted to conduct a combustion supporting gas such as air.

A more specific object is to provide a damper or valve which is positively sealed by a fluid when the damper is shut off and wherein the flowing sealant fluid is used to flush particulates from the damper seal.

Still another object of this invention is to so design the damper that it expels any accumulated combustion supporting air from the region downstream of the valve where the secondary duct system couples with the explosive gas containing primary duct system.

Still another object of the invention is to provide a secondary hood which efficiently collects the off-gases when the vessel is tilted away from the primary hood and which has means that yield so that a ladle or other material handling container may be positioned for discharging its contents into the vessel without interference by the secondary hood.

The new gas flow control damper and secondary hood will be exemplified in a rather conventional gas cleaning system associated with a steel refining vessel or converter. The conventional part of the system comprises a pivotally mounted converter vessel which has a primary gas collection hood situated over the mouth of the vessel when it is turned up for conducting the refining process. The primary hood connects, by means of ducts, to a gas cleaning system which may employ a quencher serially connected by means of a duct to a wet scrubber. Off-gases from the vessel are drawn in through the system with a fan whose inlet is connected to the wet scrubber and whose outlet is connected to a stack or gas storage vessels. A secondary hood is situated above the primary hood to collect off-gases that would ordinarily escape to the atmosphere when the vessel is turned down or tilted away from the primary hood. The secondary hood is connected with a duct which joins the gas cleaning system between the quencher and scrubber.

The new damper is situated at the junction of the secondary duct and the intermediate gas cleaning system duct. When the vessel is turned down, the damper is opened so that most of the suction from the fan is imposed on the secondary hood. When the damper is closed, the heretofore throttled down quencher is opened for full flow and the damper effects a seal which prohibits any air entering from the secondary hood. WHe closed, the damper also displaces any air which may have been captured in the space between the damper and the main carbon monoxide carrying duct.

The secondary hood is provided with a chain curtain which directs the flow of inadvertently escaping off-gases to the secondary hood when the vessel is turned down. The chain curtain maintains close coupling between the secondary hood and vessel and it also yields so that a ladle or material box may be swung with a crane between the vessel mouth and hood without any damaging collision occurring. At this time, the chain curtain also helps to prevent off-gases escaping into the atmosphere. The secondary hood is provided with means for imparting uniform suction so that it is effective in drawing gases over the entire vessel region or, in other words, deflectors are arranged therein so that all of the suction is not dissipated near the entrance near the duct which carries the off-gases away from the secondary hood.

How the foregoing objects and other more specific objects are achieved will now be explained in the ensuing more detailed description of a preferred embodiment of the invention taken in conjunction with the drawings.

DESCRIPTION OF THE DRAWINGS

FIG. 3 is an isolated elevation view of a movable damper member used in the new damper device;

DESCRIPTION OF A PREFERRED EMBODIMENT

Figure 1:
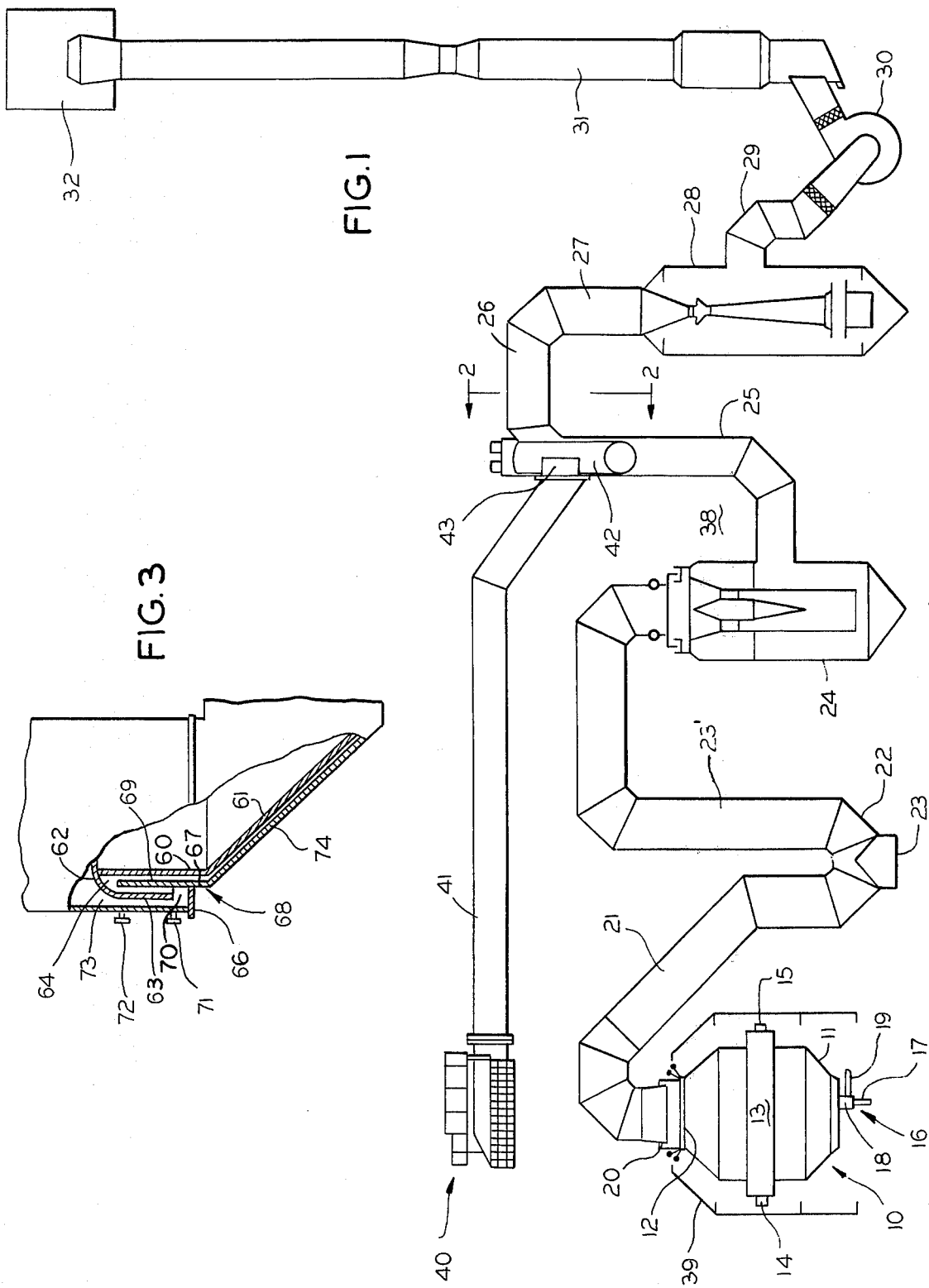
FIG. 1 is a schematic arrangement of a steel converter and gas cleaning system in which the new damper and cooperating secondary hood are employed.

FIG. 1 is a schematic diagram of a steel refining or converter vessel and its associated gas cleaning system in which the new secondary hood and gas flow control damper are used. A known type of bottom blown converter vessel is generally designated by the reference numeral 10. It comprises a refractory lined metal shell 11 having a mouth 12 at its top when the vessel is turned upright. Vessel 11 is supported in a trunnion ring 13 which has coaxial horizontal trunnion pins 14 and 15 extending from it. The trunnion pins are supported in journaled standards, not shown, so that the vessel mat be tilted by rocking the trunnion ring.

A plurality of a known type of multiple passageway tuyeres 16 extend through the shell 11 and refractory lining of the vessel and open into the vessel beneath the surface of the molten metal therein. Tuyeres 16 are essentially a pair of concentric but slightly spaced apart pipes 17 and 18. The concentric gap between the pipes is supplied with a hydrocarbon fluid through a feed pipe 19. The hydrocarbon fluid emerges into the vessel and protects the tuyeres against thermal deterioration as explained above. Nitrogen, oxygen and other process gases may be injected through central pipe 17 of the tuyeres. During processing, finely divided solids may be injected into the molten metal by suspending them in whatever gas is introduced through central pipe 17. As is known, various finely divided materials such as desulfurizing agent, burnt lime, iron oxide dust and others may be injected into the molten metal being processed in vessel 10 in this way. For a more detailed description of the tuyeres 16, reference is made to copending application Ser. No. 281,780 filed Aug. 18, 1972, now U.S. Pat. No. 3,841,617.

A gas collection hood 20 is mounted above mouth 12 of vessel 10. The primary gas collection hood is closely coupled to the mouth of the vessel when it is upright or turned up. As is known, when air or oxygen is injected into the vessel through tuyeres 16, carbon in the molten metal within the vessel 10 reacts with the oxygen to produce carbon monoxide. Finely divided particulates are also entrained in the evolving carbon monoxide and the minor amount of intermixed carbon dioxide and hydrogen which are also evolved during metal processing. The hydrogen results from breakdown or cracking of the hydrocarbon fluid which is injected concurrently with the oxygen containing gas as mentioned earlier. Carbon monoxide and hydrogen are, of course, highly combustible at the high temperature of the off-gases so it is necessary to preclude air in sufficient quantities to support combustion from entering the hood 20 and duct 21 during certain stages of processing. The off-gases collected by hood 20 from vessel 10 are conducted by ducts 21, 22 and 23 to a gas cleaning system 38 which may include a quencher 24 and a venturi scrubber 28. The vessel is surrounded by a metallic enclosure 39 which is apertured at its upper end to receive the hood 20.

Duct 21 extends generally downwardly and is coupled to a return bend 22 which may include a dust collecting pocket 23. The outflow from return bend 22 goes to a duct 23' which feeds into the top of the quencher 24, which may be a conventional type, for separating some of the particulates from the off-gases and for the preliminary cooling of the off-gases.

The quencher 24 and the scrubber 28 are coupled by a duct having a riser portion 25, a horizontal portion 26 and a descending portion 27. Clean gas from which the particulates have been separated in the scrubber 28 exits from the scrubber through a pipe 29 which leads to the inlet of a fan 30. Fan 30 contributes toward producing suction in the system all the way back to primary gas collection hood 20. Clean gas which is discharged by fan 30 enters a stack 31 which, in this example, has an atmospheric burner 32 at its top. The burner 32 effectuates burning or converting the carbon monoxide fraction of the off-gases into carbon dioxide which may be expelled into the atmosphere harmlessly. During a metal processing cycle, fan 30 is run at such rate and the flow rates through scrubber 28 and quencher 24 are so adjusted that maximum suction is created in primary gas collection hood 20. Thus, substantially all of the off-gases and suspended particulates are collected during a major portion of a processing cycle and no air is allowed to mix with the carbon monoxide containing off-gases until atmospheric burner 32 is reached where combustion occurs under controlled conditions and explosion is unlikely.

Figure 4:
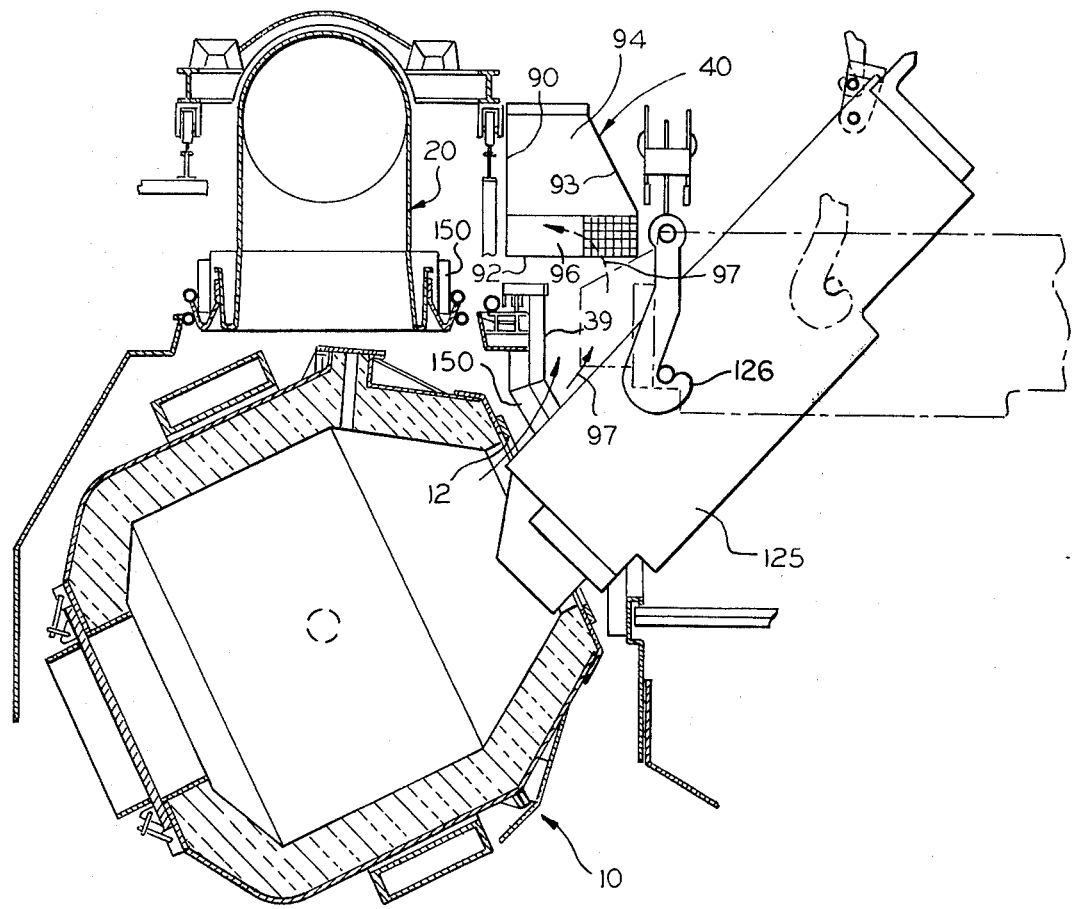
FIG. 4 is an end elevation view of a secondary hood.

When the vessel 10 is tilted from its nominally vertical position to uncouple its mouth 12 from primary gas collection hood 20 as is the case when it is desired to pour the molten contents of the vessel from its mouth or when it is desired to introduce scrap or molten hot metal into the vessel through its mouth, off-gases and fumes or smoke mixed therewith could escape from the vessel to the atmosphere and pollute it. Accordingly, there is a secondary hood, generally designated by the number 40, situated above vessel 10 as seen in FIG. 4 so when the latter is tilted, fumes and gases flow into the secondary hood. The details of hood 40 will be discussed hereafter. For the present it is sufficient to recognize that secondary hood 40 is connected by means of a duct 41 to a damper assembly or valve which is generally designated by the numeral 42. The operating mode is for damper 42 to be closed during processing when vessel 10 is turned up so that all of the off-gases flow serially from hood 20 through ducts 21 and 23, quencher 24, riser duct 25, horizontal run, 26, vertical run 27 and finally to scrubber 28 from which the gases exit. When the vessel is tilted or turned down, it is uncoupled from primary hood 20 and gases and particulates exude from mouth 12 and are intercepted by secondary hood 40. At this time, quencher 24 is throttled down or, in other words, its flow rate is reduced, so that most of the suction from fan 30 is applied to secondary hood 40 through duct 41. For example, this may be accomplished by any suitable, adjustable flow restricting device (not shown) which may be a part of or coupled into the ductwork leading to or from the quencher 24. Usually the quencher 24 flow rate is reduced by about 80% when the secondary hood 40 is in use since intense suction has to be created in the secondary hood to draw in the fumes and gases from the more distant mouth 12 of the vessel. The damper assembly 42 comprises a stationary metal tubular member 44 in which there is an axially movable damper member 45 having a beveled lower end. A short rectangular nipple 43 constituting an extension of secondary duct 41 connects into the side of tubular member 44 coincident with an opening 46 which is demarked by a dashed line in FIG. 2.

Figure 2:
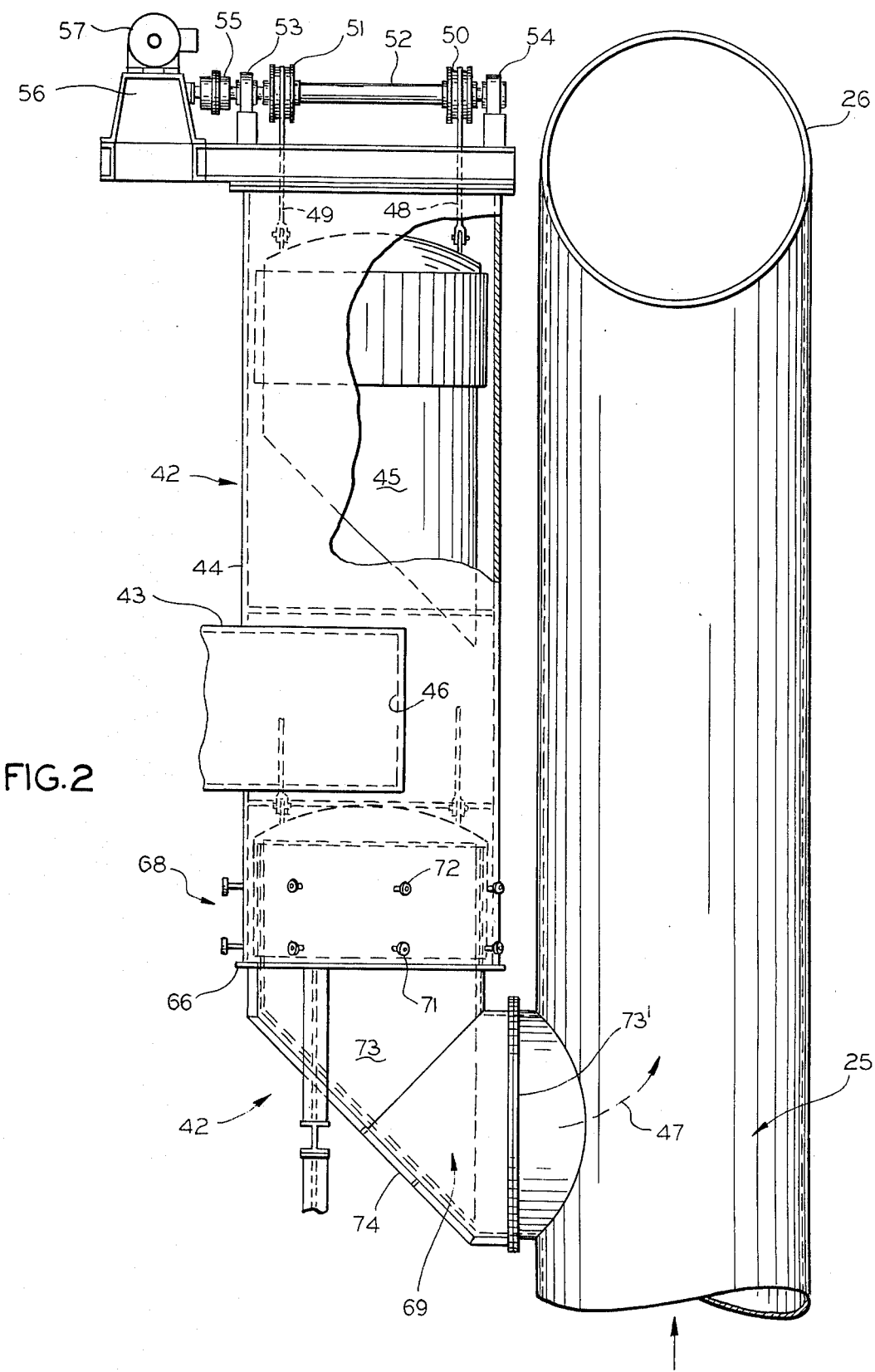
FIG. 2 is a vertical section, with some parts broken away and others shown fragmentarily, taken in the direction of the plane 2—2 in FIG. 1.

Damper member 45 is suspended on cable 48 and 49 which enable raising of the damper member to its position shown by full lines in FIG. 2 to permit gas flow from the secondary hood and to lower it to its position shown by phantom lines to prevent such gas flow as will be explained. Cables 48 and 49 are wound on drums 50 and 51 which are affixed to a shaft 52 journaled in bearings 53 and 54. A coupling 55 connects shaft 52 to a speed reducer 56 which is driven by a motor 57. It will be evident that when drums 50 and 51 are rotated in one direction, damper member 45 will descend and, when rotated in an opposite direction, damper 45 will rise to the solid line position in which it is shown in FIG. 2.

Referring now to FIG. 3, the damper member 45 includes a hollow cylindrical shell 60 which has its beveled bottom closed by a plate 61 which is at an angle with respect to the axis of cylinder 60. A bell-shaped cap member 62 is secured onto the top edge of shell 60 and the cap has an integral depending skirt 63 which is radially spaced from cylindrical shell 60 to define an annular space 64. The axially extending skirt 63 of cap 62 may be provided with a plurality of externally affixed ribs (not shown) which aid in guiding damper member 45 during its excursions up and down in stationary tubular member 44. An annular flange 66 is suitably affixed to the lower end of tubular member 44 and has a central opening 67 whose diameter is slightly in excess of the diameter of hollow cylinder 60 so that the latter can extend through opening 67 with some clearance when the damper member 45 is lowered to its bottom or gas flow interrupting position.

A water seal designated by the general reference numeral 68 with which the skirt 63 cooperates to seal the opening 67 when the bell 45 is in its lowermost position. The seal 68 includes a tubular member 69 which is affixed to the margin of opening 67 to provide a fluid tight annular cavity 70 which is defined by the lower interior portion of tubular member 44 and the exterior of the tubular portion 68.

A plurality of coolant fluid inlets 71 and outlets 72 are provided in the lower end of tubular member 44. When the damper member is down or in its closed position, a constant flow of fluid is maintained through inlets 71 and the fluid overflows through outlets 72. By this means, annular cavity 70 may be kept full of sealant fluid such as water to a level about equal to the upper extremity of tubular portion 68. The fluid, besides keeping the damper member and its surrounding components cool, and providing a seal, also flushes particulates from annular cavity 70 to thereby keep it clean.

Tubular means 69 includes a tubular downwardly extending portion 73 which is connected to an opening 73' in the conduit 25 of the gas cleaning system 38. The openings 46 and 73' define inlet and outlet openings respectively for the damper assembly 42. Tubular means 69 is closed at its bottom by a plate 74 which is at the same angle relative to the axis of tubular means 68 as is bottom enclosure plate 61 with respect to the axis of cylindrical shell 60 of the damper member. The angulated bottom 61 of damper member 45 and angulated plate 74 of elbow 69 are parallel and in contact with each other when damper member 45 is in its lowermost position and the outside of cylindrical shell 60 has a diameter almost as large as the inside diameter of tubular means 68 so that when the damper member is down, as shown in broken lines in FIG. 2, gas from duct 25 is prevented from entering elbow member 69. This minimizes the tendency for gas with combustible levels of carbon monoxide from being captured in the elbow member 69.

It will be appreciated that when damper member 45 is raised, there is an unrestricted flow passage in tubular element 44 for gas flowing in through opening 46 to continue into riser 25 in the flow path to scrubber 28. Gas flowing out of damper assembly 42 generally follows the path indicated by the dashed line arrow 47. When damper member 45 is lowered to its position in tubular member 44 shown by dashed lines in FIG. 2, element 45 constitutes a plug which prohibits flow of gas from entrance port 46 to riser duct 25.

Attention is now invited to FIGS. 4-11 for a more detailed description of the secondary hood 40 whose operation is controlled by the damper device just described. Secondary hood 40 comprises several structural members which define a hollow frame that is lined with metal plate to define the entrance to a duct as will be explained. The duct is the essential component and the frame merely provides a support for it. As can be seen in FIG. 4, the hood 40, which is an extension of duct 41, includes a side wall 90 which is impervious throughout its height, a top wall 91 and bottom wall 92, and inclined front and end walls 93 and 94. The vertical extent of the front and end walls 93 and 94 is less than that of the side wall 90 and a vertical skirt portion 96 extends downwardly from the end wall 94 and is shorter to define an opening with the front wall through which gases rising from the vessel may flow as indicated by arrows 97 shown in FIGS. 4 and 5.

Figure 9:
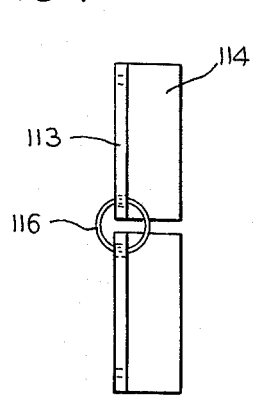
FIGS. 8 and 9 are elevation and side views of other curtain portions isolated from FIG. 5.
Figure 8:
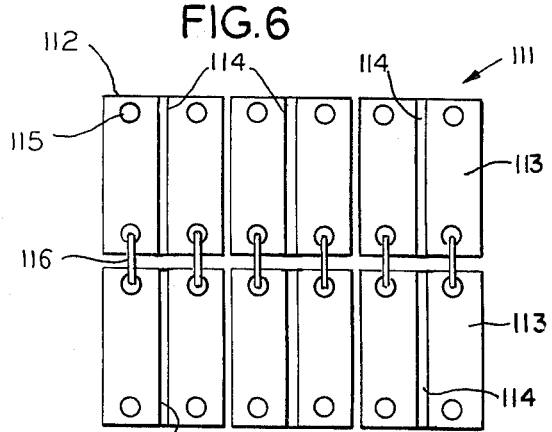

The gaps in the front and end walls 93 and 94 are occupied by a chain curtain which is generally designated by the numeral 110. The bottom of the chain curtain is open to permit unimpeded inflow of collected gases and fumes from the mouth of vessel 10 when it is tilted. The chain curtain comprises a multiplicity of plates which are T-shaped in cross section. The front row of plates 111 are visible in profile in FIG. 4 and frontally in FIG. 5. FIGS. 8 and 9 show these T-shaped members 111 isolated for the sake of clarity. One of the members in FIGS. 8 and 9 is marked 112 and will be described in detail. It comprises a base plate 113 which has an integral perpendicularly extending rib 114. On opposite sides of the rib the base 113 has pairs of holes 115 which enables forming the members into a chain by means of rings 116 which pass through holes in adjacent members into a chain by means of rings 116.

Figure 5:
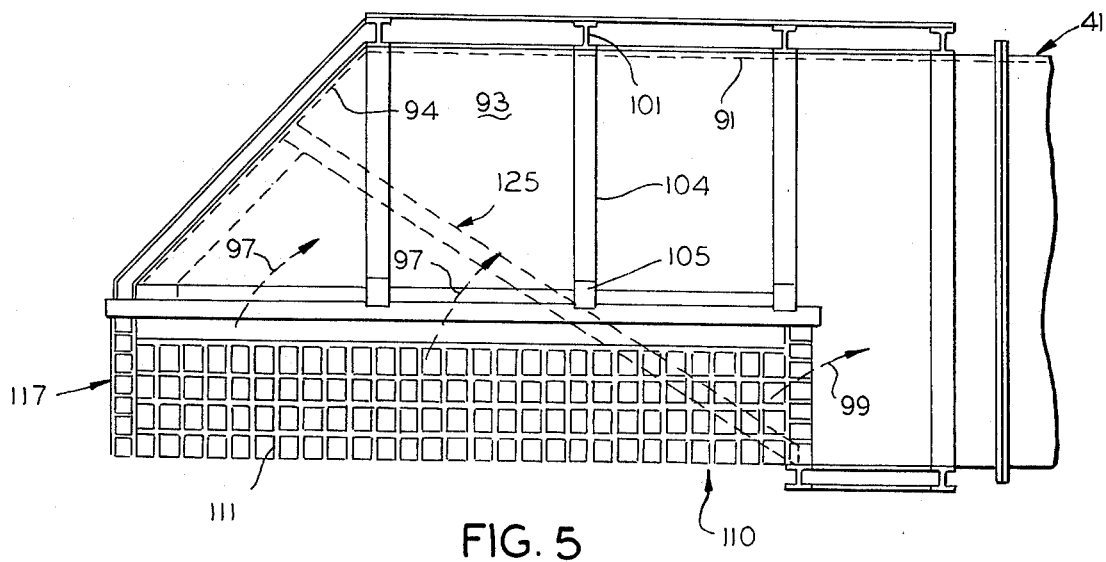
FIG. 5 is a front elevation view of the secondary hood shown in the preceding figure.
Figures 6, 7:
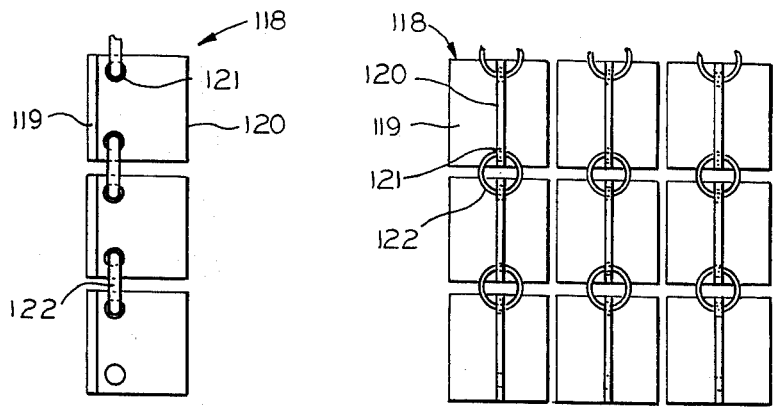
FIGS. 6 and 7 are respectively front and side views of chain curtain portions isolated from FIG. 5.

The section 117 of chain curtain 110 is visible frontally in FIG. 4 and in profile in FIG. 5. Some of the members which make up the end section are shown isolated in FIGS. 6 and 7 where one of them is designated by the reference numeral 118. An exemplary one of the members 118 comprises a base plate 119 from which an integral rib 120 extends. Each rib has a pair of holes 121 which enables joining together of the member with ring 122. The chain curtain thus comprises a plurality of vertical columns of members which are free to swing inwardly of each other and yet, because of the relatively close spacing between them they serve to define an enclosure which is open on its bottom and top.

The chain curtain 110 can yield when it is struck by an object such as a ladle or the scrap charging box 125 which is shown in FIG. 4. It is evident that if scrap box 125 is inadvertently shifted to the left in FIG. 4, as shown by phantom lines it will be enshrouded by the chain curtain 110, thereby yielding to avoid damage to the structure and providing an enclosure for directing gases and particulates emanating from vessel 10 into the duct.

Figure 10:
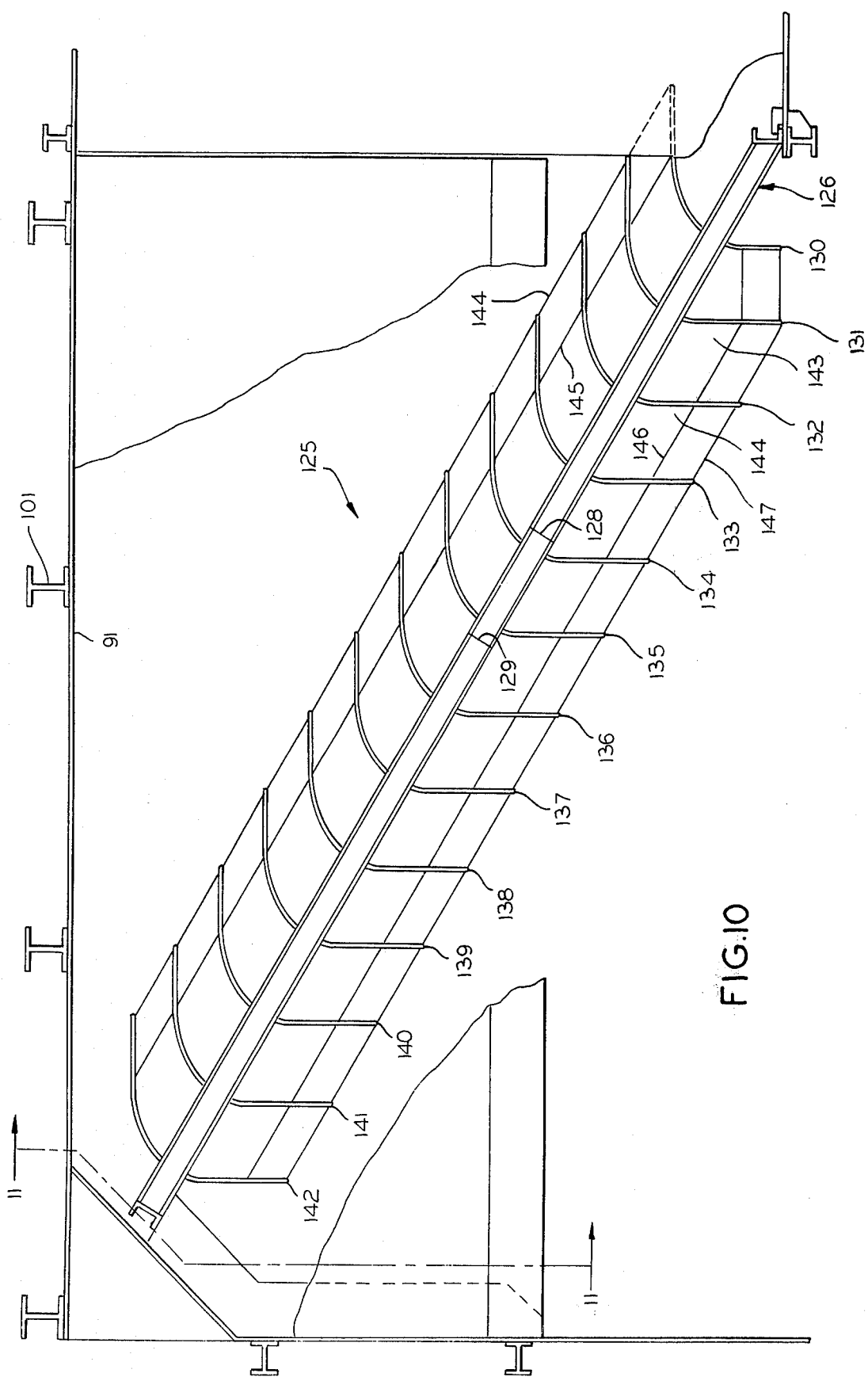
FIG. 10 shows a side view of a baffle assembly used in the secondary hood, parts of the hood being broken away to show the baffle.
Figure 11:
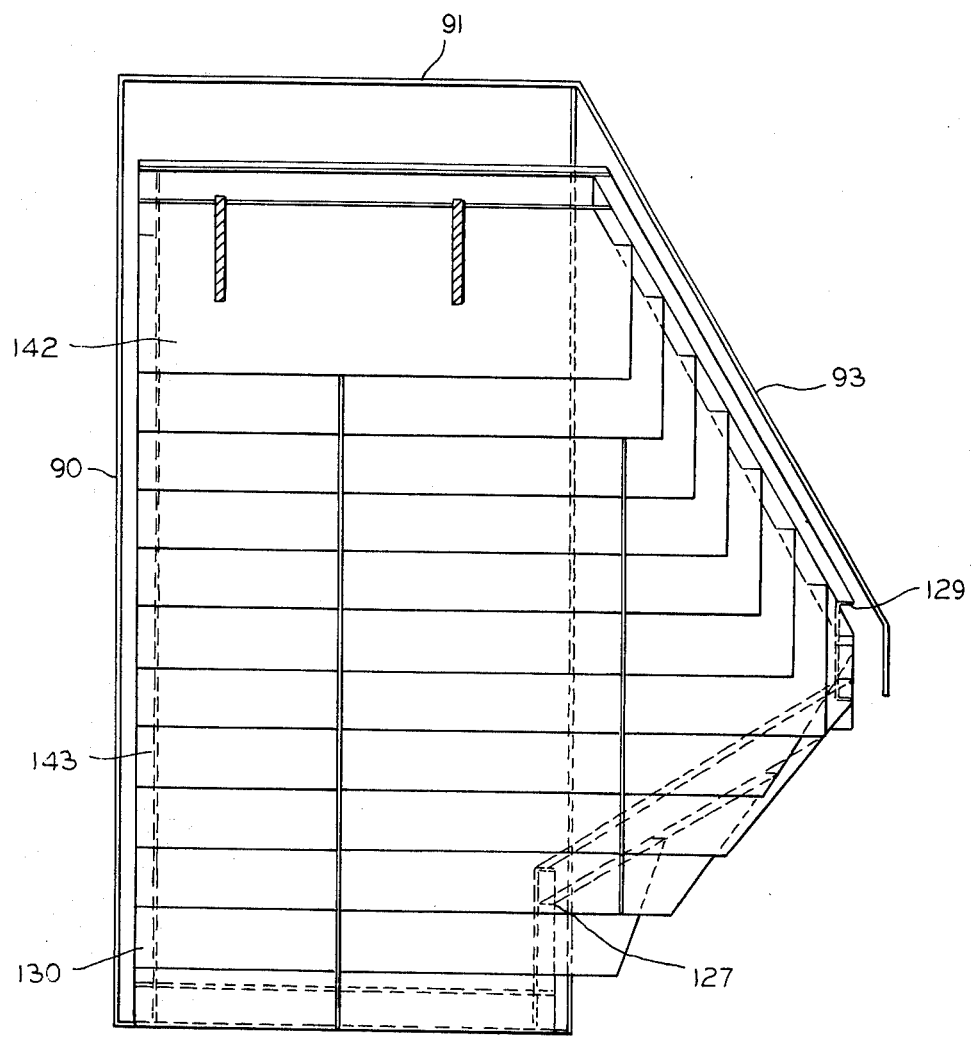
FIG. 11 is a view of the baffle assembly taken in the direction of the plane 11—11 in FIG. 10.

In FIG. 5 it is evident that the major portion of the suction generated in main duct 41 would be applied at the end of the chain curtain through which the gas indicated by the arrow 99 flows. In other words, suction would not be felt far down the chain curtain toward the end 117, for example, due to the short circuiting effect that might occur. To preclude this possibility and to obtain more uniform suction throughout the interior of the length of the chain curtain 110, some baffles 125 are provided. In FIG. 5, the baffles are merely shown as dashed or hideen lines. The details of the baffles will now be described in reference to FIGS. 10 and 11. In FIG. 10 the baffle assembly is shown to comprise a channel member 126 which is at an angle agreeing with the angle of the assembly 125 in FIG. 5. Channel member 126 has a number of offsets indicated by the lines 128 and 129 and the channel acts as a backbone to which a plurality of rearwardly extending curved baffle plates such as 130-142 extend. The baffles define curves elongated spaces between them such as the spaces 143 and 144 through which the gases pass upwardly as viewed in FIG. 10 and then sidewise toward the duct 41. The backbone channel 126 is comprised of a number of offset sections which are defined by the lines 127-129 as is evident from FIG. 11. The baffles are also supported on an angulated channel 143. They are joined together by rods or straps 144.

From inspection of FIG. 10, it will be evident that gases flowing upwardly from the vicinity of the vessel mouth will be subjected to the suction created in the duct 41 leading back to fan 30. The downwardly depending portions of baffle plates 131-142 define vertical channels which direct the suction upwardly and interfere with the horizontal component of suction. Thus, the upwardly flowing gases tend to reach the uppermost one of the baffle spaces rather than to be short circuited by making a horizontal turn near the region which is occupied by the lower baffles. This results in substantially uniform suction throughout the length of the open bottomed duct which is circumscribed by the chain curtain.

In operation of the system illustrated in FIG. 1, the metallurgical vessel 10 will be oriented in a vertical position wherein its open upper end or mouth 12 is disposed immediately below the gas collecting hood 20. Off-gases emanating from the metallic charge within the vessel 10 are collected by the hood 20 for conduction by ducts 21, 22 and 23 to the gas cleaning system 38 for serially passing through the quencher 24 and the venturi-scrubber 28. As can be seen in FIG. 4, however, when it is desired to charge the vessel 10 such as by means of the scrap charging box 125, it is necessary to tilt the vessel about its trunnion pins 14 such that its mouth 12 is no longer in alignment with the gas collecting hood 20. As those skilled in the art will appreciate, the hood 20 may be provided with a elevatable skirt portion 150 which permits movement into and out of engagement with the mouth 12 to permit rotation of said vessel and to reestablish a closed relation when the vessel is returned to its upright position.

When the vessel is in its tilted position as shown in FIG. 4, the scrap box 125 may be inserted through a suitable charging opening 151 in enclosure 39 and which opening is normally covered by charging doors (not shown). When the charging doors are open, gases 97 emanating from the vessel 10 may escape outwardly through the charging opening 150. Secondary hood 40 is positioned above the charging opening such that the gases 97 will pass upwardly into said hood for passage to the gas cleaning system 38.

During normal operation, the bell damper 45 is in its lowermost position thereby isolating the secondary hood 40 and the duct 41 from the gas cleaning system by closing the lower end of conduit member 44 relative to the end opening 46 and duct 41. When the vessel is to be turned down for charging as illustrated in FIG. 5 or for some other purpose as those skilled in the art will appreciate, the motor 57 is operated to raise the bell damper 45 to its elevated position shown by phantom lines in FIG. 2 whereupon the passage between duct 41 and the duct 25 of the gas cleaning system is open thereby connecting the secondary hood 40 to the upper end of the venturi-scrubber 28. So long as the vessel 10 is in its turned down position, the bell damper 45 will be retained in its elevated position. When the vessel is returned to its upright position, however, the bell damper will be lowered to its lowermost position wherein it isolates the hood 40 and duct 41 from the gas cleaning system 38.

It will be appreciated that normally when the vessel is in its turned down position, inert gases such as nitrogen will preferably be blown through the bottom tuyere assembly 16 in which case the cleaning requirements will be substantially less during a normal oxygen blowing period. As a result, the secondary hood 40 may be connected between the quencher 24 and the venturi-scrubber 28 thereby minimizing the load placed on the gas cleaning system 38.

Although a single embodiment of the invention has been disclosed and claimed, it is not intended to be limited thereby but only by the scope of the appended claims.

I claim:

1. Metallurgical apparatus including,
   a metallurgical vessel having an open upper end and means for delivering process gases to a quantity of metal contained therein,
   means for tilting said vessel between first and second positions, a gas cleaning system,
   first gas collecting hood means for collecting off-gases from said vessel when the same is in its first position,
   first conduit means for connecting said first gas collecting hood means to said gas cleaning system, second gas collecting hood means for collecting off-gases from said vessel when said vessel is in its second position, second conduit means for connecting said second gas collecting hood means to said gas cleaning system, damper means for coupling and uncoupling said second conduit means and said gas cleaning system, said damper means including third conduit means defining a passage and having an inlet coupled to said second conduit means and an outlet connected to said gas cleaning system, said third conduit means having a first portion lying between said inlet and said outlet to define a flow path and a second portion lying outside of said path, and a bell damper disposed in said third conduit means and including a body portion and being movable longitudinally therein between a first position so that said body portion projects into the first portion of said conduit means and between said inlet and said outlet for interrupting the flow path between said inlet and said outlet and a second position in the second portion of said third conduit means wherein the body portion is spaced from the flow path between said inlet and outlet, said body portion being sized to substantially occupy the first portion of said conduit means when in said first position to prevent the accumulation of gases therein.

2. The apparatus set forth in claim 1 wherein said third conduit means includes a first generally tubular member and said bell damper comprises a second generally tubular member, said second tubular member being mounted in said first tubular member for generally longitudinal movement between said first and second positions.

3. The apparatus set forth in claim 2 wherein said outlet is adjacent the first position of said bell damper, said bell damper substantially completely occupying that portion of said third conduit means adjacent said outlet to prevent the collection of gases in said passage from said gas cleaning system.

4. The apparatus set forth in claim 1 wherein said gas cleaning system includes first and second serially connected gas cleaning means each having an inlet and an outlet, said first conduit means being connected to the inlet of said first gas cleaning means, the outlet of said third conduit means means being connected to the inlet of said second gas cleaning means.

5. The invention set forth in claim 1 and including seal means associated with said passage defining means and adjacent the first position of said damper element, said damper means being movable into sealing engagement with said seal means for sealing said flow passage as the damper moves to its first position.

6. The apparatus set forth in claim 5 and including seal means disposed in said passage and proximate to the closed position of said bell means, said bell means including means cooperating with said seal means as said bell moves into its closed position for sealing said flow passage.

7. Metallurgical apparatus including, a metallurgical vessel having an open upper end and means for delivering process gases to a quantity of metal contained therein, means for tilting said vessel between first and second positions, a gas cleaning system including first and second serially connected gas cleaning means each having an inlet and an outlet, first gas collecting hood means for collecting off-gases from said vessel when the same is in its first position, first conduit means for connecting said first gas collecting hood means to the inlet of said first gas cleaning means, second gas collecting hood means for collecting off-gases from said vessel when said vessel is in its second position, second conduit means for connecting said second gas collecting hood means to said gas cleaning system, damper means for coupling and uncoupling said second conduit means and said gas cleaning system, said damper means including a first tubular means and a second tubular means surrounding at least a part of said first tubular means and defining therewith a recess for receiving a liquid, said second tubular means having a gas flow inlet opening coupled to said second conduit means and said first tubular means has an outlet connected to the inlet of said second gas cleaning means, said second conduit means having a first portion lying between said inlet and said outlet to define a flow path and a second portion lying outside of said path, and a damper element disposed in said second tubular means and being movable between a first position within the first portion thereof and between said inlet and said outlet for interrupting the flow path between said inlet and said outlet and a second position in the second portion of said passage defining means wherein a flow path between said inlet and outlet is open, said damper element including seal means associated therewith for extending into said recess when said member is in its position for cooperating with a liquid therein for effecting a fluid seal about said seal means.

8. The invention set forth in claim 7 wherein said damper element includes body means for extending into said first tubular means when said element is moved toward its gas flow interrupting position, said body means thereby being adapted for displacing any gas which accumulated in said first tubular means when said damper element was in its second position.

9. The invention set forth in claim 8 including reversible motor means, and means mechanically connecting said motor means to said damper element for effecting bidirectional movement of said element in said second tubular means when said motor means is operated.

10. The invention set forth in claim 7 wherein said damper element comprises a tubular member having a depending continuous wall comprising said seal means for extending into said recess and a closed top.

11. The invention set forth in claim 10 wherein said tubular member is disposed within said first tubular means when in its first position and substantially occupying the same for displacing gas therefrom.

12. The invention set forth in claim 7 wherein said first and second tubular means are substantially vertical, flexible means attached to said damper element and extending toward the upper end of said second tubular means, drum means to which said flexible means is connected, said drum means being journaled for rotation proximate the upper end of said second tubular means, and drive means including motor means for rotating said drum means reversibly to thereby enable advancement sand retraction of said damper element relative to said fluid recess.

13. Metallurgical apparatus including,
a metallurgical vessel having an open upper end and means for delivering process gases to a quantity of metal contained therein,
means for tilting said vessel between first and second positions, a gas cleaning system,
first gas collecting hood means for collecting off-gases from said vessel when the same is in its first position,
first conduit means for connecting said first gas collecting hood means to said gas cleaning system,
second gas collecting hood means for collecting off-gases from said vessel when said vessel is in its second position,
second conduit means for connecting said second gas collecting hood means to said gas cleaning system,
damper means for coupling and uncoupling said second conduit means and said gas cleaning system,
said damper means including a first upright cylindrical pipe means having its lower open end communicating with a said gas cleaning system,
a second upright cylindrical guide pipe having a gas inlet opening intermediate its ends, the lower end portion of said guide pipe surrounding an upper end portion of said first pipe in concentric spaced relation to define a sealing fluid accommodating annular space,
means for sealing the bottom of said annular space,
fluid inlet means near the bottom of said annular space and fluid outlet means near the top thereof,
and a damper element comprising an inverted bell-like damper member having a depending cylindrical portion and a top closure, said damper element being movable in said guide pipe to a second position above said inlet opening to thereby enable gas flow from said inlet opening to said first upright cylindrical pipe, and said damper member being movable to said first position below said inlet opening whereupon its cylindrical depending portion is sealed by fluid in said annular space to thereby prevent said gas flow.

14. The invention set forth in claim 13 including chamber defining means between said lower end of said first pipe and said conduit,
said bell-like damper element having a gas impervious generally cylindrically extension means depending therefrom, said extension means extending through said first cylindrical means and into said chamber defining means when said damper element is lowered to displace any gas accumulated therein when said damper element is moved to its second position.

15. The invention set forth in claim 14 wherein the lower end of said extension means is at an angle relative to the axis thereof, and said chamber defining means has a wall which is in parallelism with said lower end.

16. Metallurgical apparatus including,
a metallurgical vessel having an open upper end and means for delivering process gases to a quantity of metal contained therein,
means for tilting said vessel between first and second positions, a gas cleaning system,
first gas collecting hood means for collecting off-gases from said vessel when the same is in its first position,
first conduit means for connecting said first gas collecting hood means to said gas cleaning system,
second gas collecting hood means for collecting off-gases from said vessel when said vessel is in its second position,
second conduit means for connecting said second gas collecting hood means to said gas cleaning system,
damper means for coupling and uncoupling said second conduit means and said gas cleaning system,
said damper means including a first generally tubular member defining a passage and having an inlet coupled to said second conduit means and an outlet connected to said gas cleaning system, said passage defining means having a first portion lying between said inlet and said outlet to define a flow path and a second portion lying outside of said path,
and a damper element comprising a second generally tubular member disposed in said first generally tubular member and being generally longitudinally movable therein between a first position within the first portion thereof and between said inlet and said outlet for interrupting the flow path between said inlet and said outlet and a second position in the second portion of said passage defining means wherein a flow path between said inlet and outlet is open,
and a liquid seal defining means associated with said first generally tubular member and in the second position thereof, said damper element being movable into and out of sealing relation with said liquid seal as it moves into and out of its first position.

17. Metallurgical apparatus including,
a metallurgical vessel having an open upper end and means for delivering process gases to a quantity of metal contained therein,
means for tilting said vessel between first and second positions, a gas cleaning system,
first gas collecting hood means for collecting off-gases from said vessel when the same is in its first position,
first conduit means for connecting said first gas collecting hood means to said gas cleaning system,
second gas collecting hood means for collecting off-gases from said vessel when said vessel is in its second position,
second conduit means for connecting said second gas collecting hood means to said gas cleaning system,
damper means for coupling and uncoupling said second conduit means and said gas cleaning system,
said damper means including means defining a passage and having an inlet coupled to said second conduit means and an outlet connected to said gas cleaning system, said passage defining means having a first portion lying between said inlet and said outlet to define a flow path and a second portion lying outside of said path,
and a damper element disposed in said passage defining means and being movable between a first position within the first portion thereof and between said inlet and said outlet for intertupting the flow path between said inlet and said outlet and a second position in the second portion of said passage defining means wherein a flow path between said inlet and outlet is open,
said second gas collecting hood includes an enclosure having a bottom opening and side walls, a portion of said side walls comprising a plurality of flexibly connected individual members to permit engagement thereof by vessel charging apparatus without damage thereto, said second conduit means opening the side of said enclosure and baffle means disposed in said second gas collecting hood for redirecting gases entering the same toward said second conduit means.

18. Apparatus for handling gaseous products including combustible gases emitted by a metallurgical processing vessel which is adapted for being tilted about an axis, said vessel having at least one major opening for discharging said products, comprising:

gas cleaning means,
primary hood means proximate with said opening when said vessel is in one range of angular positions to collect gases emitted from said vessel,
secondary hood means adjacent said primary hood means and positioned for receiving gases therein jointly with said primary hood means when said vessel is in another range of angular positions,
first conduit means for connecting said primary hood means to said gas cleaning means,
second conduit means connecting to said secondary hood means,
generally tubular third conduit means including a first segment connected to said second conduit means and having an outlet portion connected to said gas cleaning means for defining a gas flow passge therebetween, said third conduit means also including a second portion disposed outside of said flow passage,
and damper means including a body portion conforming generally to at least the outlet portion of said first segment and being closed at its opposite ends, said body portion being movable longitudinally within said third conduit means between said second segment and the outlet portion of said first segment for selectively opening and closing the gas flow passage and for displacing gas from at least the portion of said first segment and for preventing the accumulation of gases therein.

19. The apparatus set forth in claim 18 wherein said third conduit means includes a first generally tubular member and the body portion of said damper means comprises a second generally tubular member, said second generally tubular member being mounted in said first tubular member for generally longitudinal movement between a first position within said segment and second positions outside of said segment, said segment having an outlet adjacent the first position of said damper means, said second tubular member substantially complete occupying that portion of said segment adjacent said outlet to prevent the collection of gases in said segment from said gas cleaning means.

20. The apparatus set forth in claim 18 wherein said third conduit means includes a first tubular means and a second tubular means surrounding at least a part of said first tubular means and defining therewith a recess for receiving a liquid, said second tubular means having a gas flow opening,
said damper means being movable in said second tubular means between said first and second positions, said damper means element including seal means associated therewith for extending into said recess when said member is in its position for cooperating with a liquid therein for effecting a fluid seal about said seal means.

21. The invention set forth in claim 20 wherein said damper means element includes body means for extending into said first tubular means when said element is moved toward its gas flow interrupting position, said body means thereby being adapted for displacing any gas which accumulated in said first tubular means when said damper element was in its second position.

22. The invention set forth in claim 21 wherein said damper means comprises a tubular member having a depending continuous wall comprising said seal means for extending into said recess and a closed top.

23. The invention set forth in claim 22 wherein said tubular means is disposed within said first tubular means when in its first position and substantially occupying the same for displacing gas therefrom.

* * * * *